N. & G. BEAM.
THRESHING MACHINE.
APPLICATION FILED AUG. 22, 1912.
1,059,108.
Patented Apr. 15, 1913.
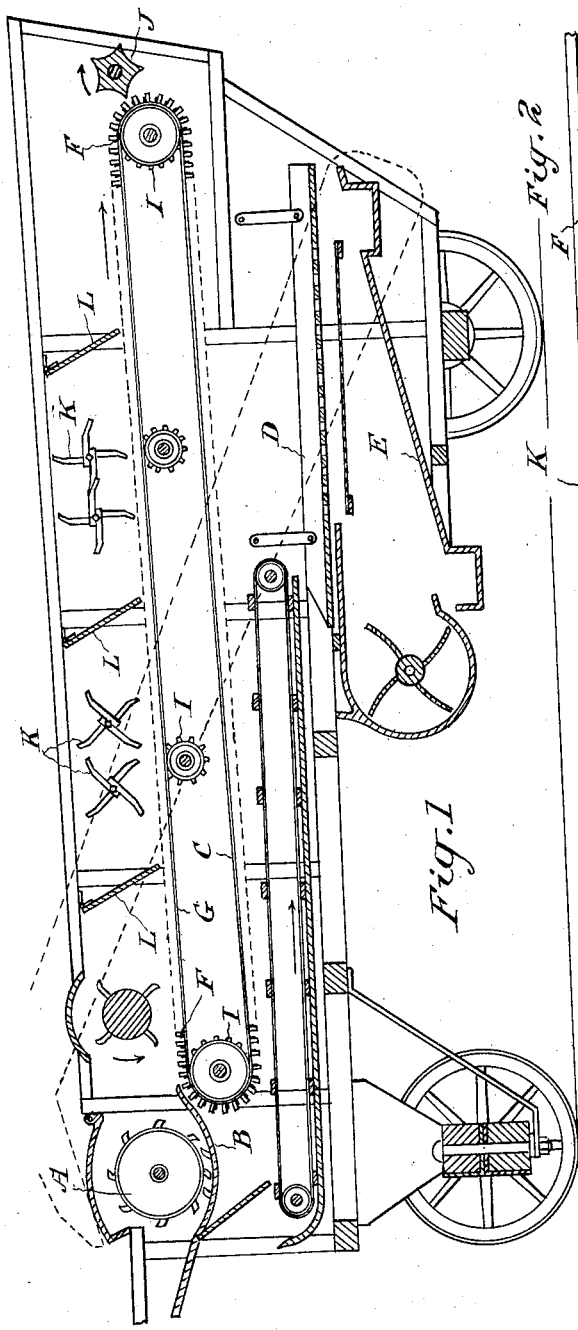
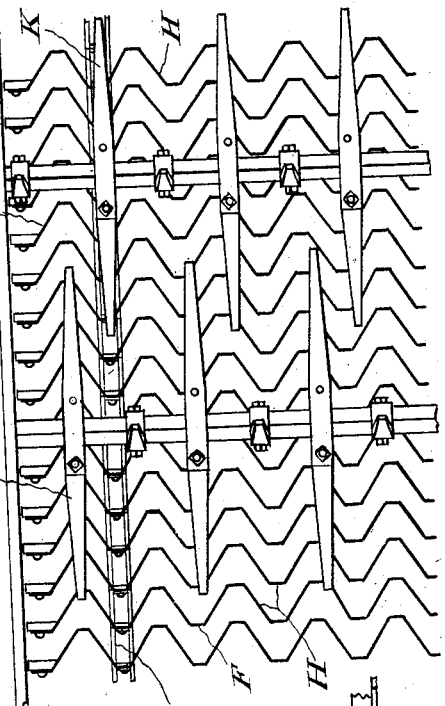
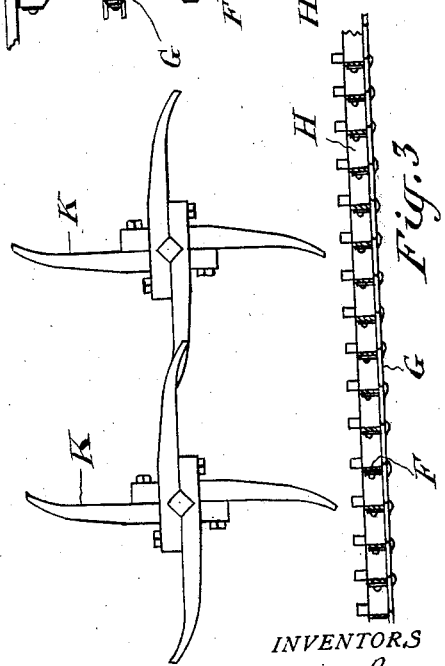
WITNESSES:
INVENTORS
Nathaniel Beam
Gideon Beam
BY J. Edward Maybee
ATTORNEY.

UNITED STATES PATENT OFFICE.

NATHANIEL BEAM AND GIDEON BEAM, OF WATERLOO, ONTARIO, CANADA.

THRESHING-MACHINE.

1,059,108.  Specification of Letters Patent.  Patented Apr. 15, 1913.

Application filed August 22, 1912. Serial No. 716,529.

*To all whom it may concern:*

Be it known that we, NATHANIEL BEAM and GIDEON BEAM, of the town of Waterloo, in the Province of Ontario, Canada, have invented certain new and useful Improvements in Threshing-Machines, of which the following is a specification.

This invention relates particularly to threshing machines of the type in which endless traveling straw and grain decks are employed, and our object is to improve the construction of such machines so as to more effectively separate the grain from the straw.

In our machine the straw deck is formed as a traveling grate and its bars are given a zig-zag form to break the gaps between the bars. Over the grate are located a plurality of pickers, preferably arranged in pairs, and rotating so as to lift the straw and throw it rearwardly along the deck. Behind each pair of pickers is located a gate or retainer hinged at its upper edge to the frame of the machine and tending to prevent the straw from being thrown back to the rear end of the machine by the pickers.

Figure 1 is a longitudinal section of our improved machine. Fig. 2 is an enlarged plan view of part of the traveling straw deck, and Fig. 3 is a cross section through the parts shown in Fig. 2.

In the drawings, like letters of reference indicate corresponding parts in the different figures.

The machine in its main features is of well known construction—A being the cylinder, B the concave, C an endless traveling grain deck, D a vibratory chaffer, and E the shoe.

The straw deck comprises a series of cross bars F connected to sprocket chains G. Each bar is of zig-zag form and the bars are so set that the zig-zags H of each bar overlap the zig-zags of the adjacent bars and thus break the gaps between the bars. This arrangement not only aids materially in the separation of the grain from the straw, but also enables us to reduce the number of cross bars needed to a minimum as the spacing of the bars may be increased as compared with straight bars without danger of straw falling through. The chains G are carried by the suitably journaled and located sprocket wheels I.

At the rear end of the straw deck is located a rotary picker J which strips the straw from the bars of the straw deck and prevents it being carried underneath, the zig-zags H extending forwardly as described are readily stripped by the picker which so rotates that it moves upwardly at its forward side.

Above the straw deck are located a plurality of rotary pickers K which so rotate as to throw the straw rearwardly along the deck. These pickers are preferably arranged in pairs so that one strips the other. Behind each pair of pickers is located a gate or retainer L hinged at its upper edge to the frame of the machine. These gates tend to throw down upon the grate the straw which has been picked up and thrown rearwardly by the pickers, but yield readily to allow the straw to be moved to the rear by the travel of the deck. By this combination we obtain an even more complete separation than is possible with vibratory straw decks with much less wear and tear and expenditure of power.

What we claim as our invention is:—

1. In a thresher a straw deck comprising a series of transverse bars of zig-zag form, and suitably carried endless chains carrying said bars.

2. In a thresher a straw deck comprising a series of transverse bars of zig-zag form, and suitably carried endless chains carrying said bars in combination with a rotary picker located at the rear of the deck and adapted to prevent straw passing around to the underside of the deck.

3. In a thresher a straw deck comprising a series of transverse bars of zig-zag form, the zig-zags of the bars overlapping to break the gaps between the bars, and suitably carried endless chains carrying said bars.

Dated at Waterloo this tenth day of July 1912.

NATHANIEL BEAM.
GIDEON BEAM.

Signed in the presence of—
GEO. A. BRUCE,
FRED M. HAHN.

---

Copies of this patent may be obtained for five cents each, by addressing the "Commissioner of Patents, Washington, D. C."